April 27, 1926.  1,582,658

D. J. ANGUS

SATURATION COMPENSATION FOR METERS

Filed May 26, 1922

INVENTOR
Donald J. Angus,
BY
ATTORNEY

Patented Apr. 27, 1926.

1,582,658

UNITED STATES PATENT OFFICE.

DONALD J. ANGUS, OF INDIANAPOLIS, INDIANA, ASSIGNOR TO WESTINGHOUSE ELECTRIC & MANUFACTURING COMPANY, A CORPORATION OF PENNSYLVANIA.

SATURATION COMPENSATION FOR METERS.

Application filed May 26, 1922. Serial No. 563,914.

*To all whom it may concern:*

Be it known that I, DONALD J. ANGUS, a citizen of the United States, residing at Indianapolis, in the county of Marion and State of Indiana, have invented a new and useful Saturation Compensation for Meters, of which the following is a specification.

It is the object of my invention to compensate for errors in electric meters arising from the approach toward saturation of the magnets upon increases in their energizing currents; with particular reference to volt-ampere meters of the type shown in my Canadian Patent No. 217,581, granted April 11, 1922, though the invention is also applicable to other types of meters.

In carrying out my invention, fundamentally, I provide a magnetic shunt across the poles of the magnet to be compensated, in parallel to the magnetic path which actuates the meter element, and make this shunt such that it appproaches saturation sooner than does the actuating magnetic path and the remainder of the magnetic circuit; so that at low energization this magnetic shunt carries a fairly large part of the flux and thus diverts it from the actuating path, but as the energization increases the shunt approaches saturation and froces a larger proportion of the total flux through the actuating magnetic path.

Figure 1:
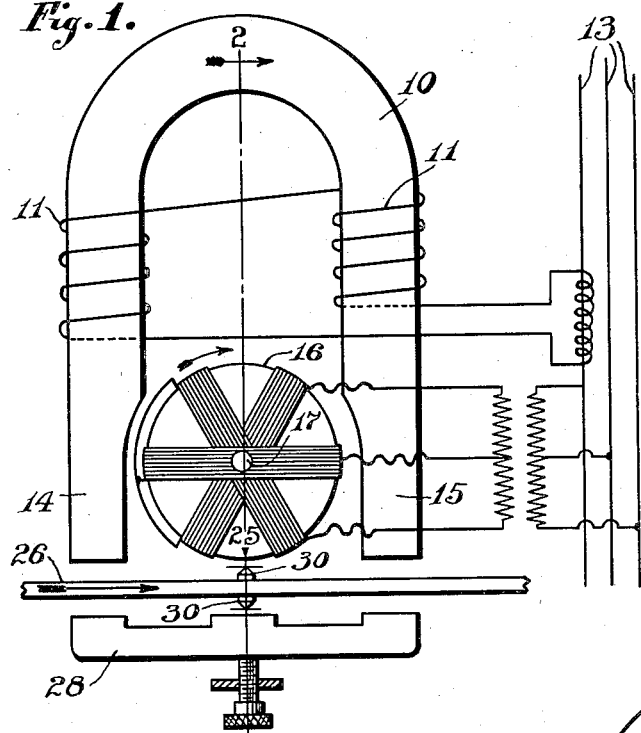
Figure 3:
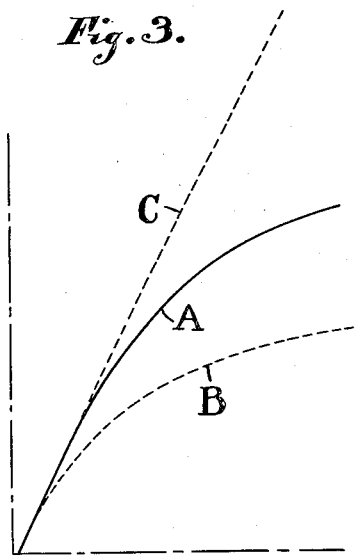
Figure 2:
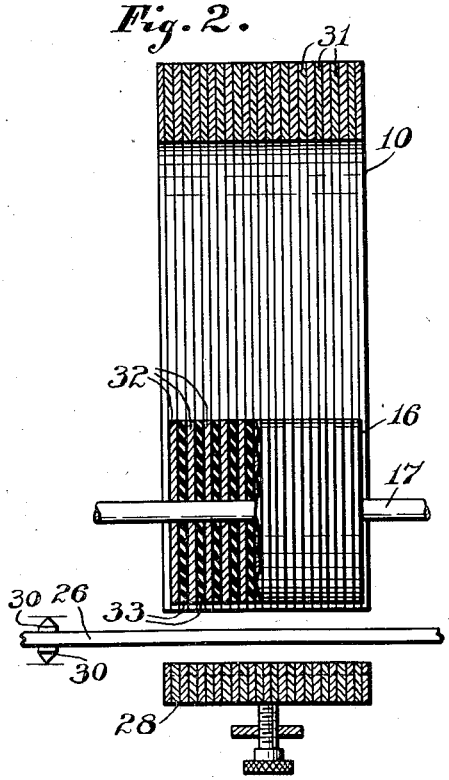
Figure 4:
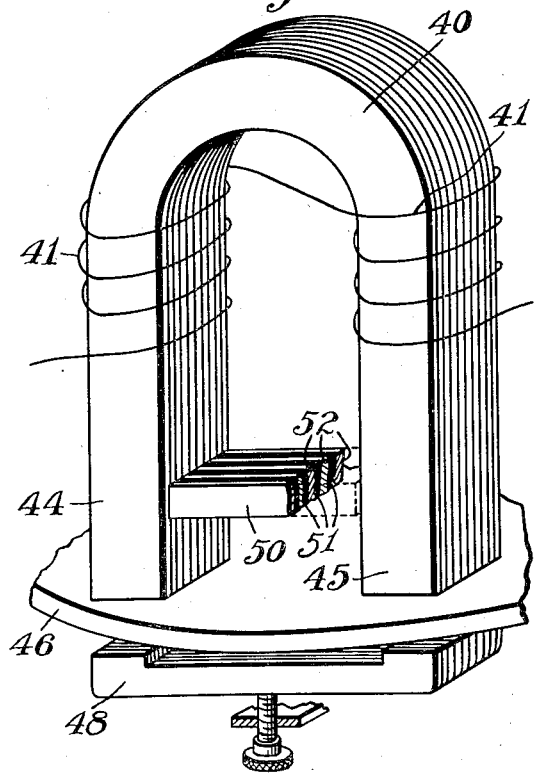

The accompanying drawing illustrates my invention: Fig. 1 is an elevation of one element of a volt-ampere meter embodying my invention, such element being for the type of volt-ampere meter shown in my aforesaid Canadian patent; Fig. 2 is a vertical section on the line 2—2 of Fig. 1; Fig. 3 is a diagram intended to make clear the magnetic action of my invention; and Fig. 4 is a perspective view of an element of an ammeter embodying my invention.

The volt-ampere meter of the type shown in my aforesaid Canadian patent has one or more actuators for moving a meter element, but as the compensation may be the same for all the actuators it is sufficient to explain one. Such actuator has a field magnet 10 with an exciting winding 11 suitably connected to carry a current proportional to that in a leg of the alternating-current circuit 13, shown as a three-phase circuit. Between the two pole pieces 14 and 15 of the field magnet 10 is an armature 16, mounted so that it can shift rotatably on the axis of a shaft 17. This armature is here provided with exciting windings excited in proportion to the voltage of the circuit 13; and these windings are divided into the proper number of parts, three parts for a three-phase circuit, in proper relation to produce a rotating field, which is assumed to rotate in the direction of the arrow in Fig. 1.

A meter disk 26 is arranged in proximity to the pole pieces 14 and 15 of the field magnet 10, and to the armature 16 at a point 25 midway between such pole pieces. This disk is in inductive relation to the pole pieces 14 and 15 and to the point 25 so that eddy currents are induced in it by the flux from these points. Preferably a member 28 of magnetic material lies on the opposite side of the disk 26 from the field magnet 10 and armature 16, for reducing the reluctances of the various magnetic circuits, such member preferably being adjustable toward and from the disk 26 for purposes of calibration, and being provided with fingers projecting toward the disk opposite the pole pieces 14 and 15 and the point 25. The disk 26 is any suitable metal disk, for an integrating or indicating or a recording meter as desired, as explained in my aforesaid Canadian patent, and is suitably mounted on pivot pins 30.

In operation, the armature 16 tends to change position on its axis as explained in my aforesaid Canadian patent, to maintain the voltge-produced flux at the point 25 90° out of phase with the current-produced field-magnet flux from the field magnet 10, so that the rotating field of the armature will always tend to remain in quadrature with the field-magnet field with respect to a line at right angles to a line through the poles of the field magnet, regardless of the power-factor of the circuit, and therefore will tend to maintain a drag on the meter disk 26 in proportion to the volt-amperes of the circuit.

As the current consumption increases in the circuit 13, the density of the flux in the field magnet 10 increases; but as the field-magnet flux increases, it does not keep in proportion to the increase in the current strength. That is, the magnetization follows the usual magnetization curve A in Fig. 3, where ordinates indicate flux density and abscissæ indicate strength of the energizing current. In consequence of the bending of this curve A, the drag on the meter disk 26 is less than in proportion to the volt-amperes as the current strength increases, in the absence of compensation such as my present invention contemplates.

The magnetic path of the field-magnet flux divides at the pole pieces 14 and 15, one part passing from one pole to the other through the armature 16, in shunt to the other or meter-actuating part which cuts the meter disk 26 as it passes to and back from the magnetic element 28.

According to my present invention, I make the shunt path between the pole pieces 14 and 15 through the armature 16 such that it has a lighter flux density than has the field magnet itself and so more quickly approaches saturation, so that as it approaches saturation it forces a larger proportionate part of the flux across the actuating magnetic path which cuts the meter disk 26. To this end, as is clear from Fig. 2, I make the field magnet 10 all of magnetic material, of a series of laminæ 31 in alternating-current meters such as the volt-ampere meter shown, but in the preferred form of my invention I make the armature 16 of a series of laminæ which are some of magnetic material 32 while others interspersed with them are of non-magnetic material 33, such as paper or fiber. As a result, as the energizing current increases in the winding 11, the laminæ 32 of the armature approach saturation much sooner than do the laminæ 31 of the field magnet 10, with the result that a smaller proportionate part of the total number of lines of force of the field magnet can pass through the armature 16, so that a greater proportionate number are forced to pass across the air gap in which lies the meter disk 26. In other words, referring again to Fig. 3, the magnetic path divides, and that part of the field flux through the armature 16 follows a curve somewhat of the shape shown by the curve B; which makes the other part, which cuts the meter disk 26, assume very closely the straight-line curve C.

While my invention is above described in connection with a volt-ampere meter, in its broader sense it is not limited to that type of meter, but is applicable to other types of meters in which errors occur from the approach toward saturation of the magnetic material. In Fig. 4, I have illustrated my invention in a more generic form, in connection with an induction meter broadly. Here there is a field magnet 40 which acts to induce eddy currents in a meter disk 46, to produce a drag on the meter disk in any suitable way, usually with a magnetic member 48 on the opposite side of the meter disk from the field magnet 40 for reducing the reluctance of the magnetic circuit. The field magnet 40 has a suitable energizing winding 41 thereon, excited in any suitable manner according to what it is desired to meter. Between the poles 44 and 45 of the field magnet 40 I place a magnetic shunt 50 which serves to carry part of the field-magnet flux in the same general manner as does the armature 16 in the volt-ampere meter of Fig. 1; so that, as in such volt-ampere meter, only part of the field-magnet flux cuts the meter disk. The magnetic shunt 50 is so made that it approaches saturation more quickly than does the rest of the magnetic path for the field-magnet flux, as by being made of interspersed laminæ 51 and 52 respectively of magnetic and non-magnetic material, while the rest of the field-magnet magnetic path is all of magnetic material. Because the magnetic shunt 50 approaches saturation more quickly, it causes a greater proportionate part of the total number of lines of force to cut the meter disk 46 as the intensity of magnetization increases, so that such disk-cutting flux will vary fairly closely in proportion to the strength of the energizing current in the winding 41.

I claim as my invention:

1. In a meter, a magnet having an exciting winding, a meter element arranged to be acted on by flux from said magnet, and an automatically movable magnetic shunt for said magnet for diverting part of the flux away from said meter element, said shunt being constituted so that it approaches saturation more rapidly than does the magnet proper.

2. In a meter, a laminated magnet having an exciting winding, a meter element arranged to be acted on by a flux from said magnet, and a laminated magnetic shunt for said magnet for diverting part of the flux away from said meter element, said shunt being substantially as thick as the magnet and having its laminæ in parallel-plane relation to the laminæ thereof, but having a total effective thickness of magnetic material less than that of the magnet.

3. In a meter, a magnet having an exciting winding, a meter element arranged to be acted on by a flux from said magnet, and a magnetic shunt for said magnet for diverting part of the flux away from said meter element, said magnetic shunt being made of magnetic-material laminæ interspersed with laminæ of non-magnetic material disposed in parallel-plane relation to the direction of flux flow in the magnet.

4. In a meter, a magnet having an exciting winding, a meter element of conducting material arranged to have eddy currents induced in it by flux from said magnet, and an automatically movable shunt of magnetic material for shunting part of the flux from said magnet away from said meter element, said shunt being constituted so that it approaches saturation more rapidly than does the magnet proper.

5. In a meter, a laminated magnet having an exciting winding, a meter element of conducting material arranged to have eddy currents induced in it by flux from said magnet, and a shunt comprising alternate laminæ of non-magnetic and magnetic material for shunting part of the flux from said magnet away from said meter element, said shunt having a total thickness substantially equal to that of the magnet and an effective thickness of magnetic material less than that of the magnet.

6. In a meter, a laminated magnet having an exciting winding, a meter element of conducting material arranged to have eddy currents induced in it by flux from said magnet, and a structure for shunting part of the flux from said magnet away from said meter element, said shunt structure being constructed of magnetic-material laminæ interspersed with laminæ of non-magnetic material disposed in parallel-plane relation to the laminæ of the magnet.

7. A volt-ampere meter, comprising a field magnet having an exciting winding, an armature shiftably mounted in the field of said field magnet and having windings for producing a rotating field, a meter element in position to be acted on by flux from both said field magnet and said armature, said armature and said meter element being in shunt to each other with respect to the field-magnet flux, and said armature being constituted so that it approaches saturation more quickly than does the magnetic path through the field magnet and meter element.

8. A volt-ampere meter, comprising a field magnet having an exciting winding, an armature shiftably mounted in the field of said field magnet and having windings for producing a rotating field, a meter element in position to be acted on by flux from both said field magnet and said armature, said armature being constituted so that it approaches saturation more quickly than does the magnetic path through the field magnet and meter element.

9. A volt-ampere meter, comprising a field magnet having an exciting winding, an armature shiftably mounted in the field of said field magnet and having windings for producing a rotating field, a meter element in position to be acted on by flux from both said field magnet and said armature, said armature and said meter element being in shunt to each other with respect to the field-magnet flux, and said armature and said field-magnet both being laminated but said armature having a total thickness of magnetic-material laminæ less than that of said field magnet.

10. A volt-ampere meter, comprising a field magnet having an exciting winding, an armature shiftably mounted in the field of said field magnet and having windings for producing a rotating field, a meter element in position to be acted on by flux from both said field-magnet and said armature, said armature and said field magnet both being laminated but said armature having a total thickness of magnetic-material laminæ less than that of said field-magnet.

11. A volt-ampere meter, comprising a field-magnet having an exciting winding, an armature shiftably mounted in the field of said field magnet and having windings for producing a rotating field, a meter element in position to be acted on by flux from both said field-magnet and said armature, said armature and said meter element being in shunt to each other with respect to the field-magnet flux, and said armature being made of laminæ of magnetic-material interspersed with laminæ of non-magnetic material.

12. A volt-ampere meter, comprising a field magnet having an exciting winding, an armature shiftably mounted in the field of said field magnet and having windings for producing a rotating field, a meter element in position to be acted on by flux from both said field magnet and said armature, said armature being made of laminæ of magnetic material interspersed with laminæ of non-magnetic material.

In witness whereof, I have hereunto set my hand at Indianapolis, Indiana, this 23d day of May, A. D. one thousand nine hundred and twenty two.

DONALD J. ANGUS.